United States Patent [19]

Johnson et al.

[11] 4,272,668
[45] Jun. 9, 1981

[54] SMALL ROUND AIR STREAM HEATING UNIT

[75] Inventors: Norman A. Johnson, Lititz; Raymond C. Kent, Lancaster, both of Pa.

[73] Assignee: Armstrong Cork Company, Lancaster, Pa.

[21] Appl. No.: 93,198

[22] Filed: Nov. 13, 1979

[51] Int. Cl.³ .............................................. H05B 3/16
[52] U.S. Cl. .................................... 219/375; 219/367; 219/381; 338/302; 338/294; 338/280
[58] Field of Search ............................ 219/363–365, 219/369, 370, 371, 375, 380–382, 367, 368; 338/58, 207, 261, 263, 267, 270, 271, 282, 283, 284, 280, 281, 287, 279, 290, 291, 296–298, 208, 302, 316–319, 294

[56] References Cited

U.S. PATENT DOCUMENTS

| | | | |
|---|---|---|---|
| 1,096,289 | 5/1914 | Dale et al. | 338/290 |
| 1,719,872 | 7/1929 | Calcott | 219/375 |
| 2,715,671 | 8/1955 | Harrison | 338/297 |
| 2,731,713 | 1/1956 | Schaefer | 219/375 |
| 3,265,865 | 8/1966 | Hager, Jr. | 219/369 |
| 3,346,720 | 10/1967 | Siegla | 219/464 |
| 3,770,389 | 10/1973 | Kitzner et al. | 219/374 |
| 3,886,739 | 6/1975 | Lee | 60/286 |
| 3,952,182 | 4/1976 | Flanders | 219/381 |

Primary Examiner—Richard R. Kucia
Assistant Examiner—Bernard Roskoski

[57] ABSTRACT

An electric air stream heater adapted to operate directly on 120 volts with a wattage output of less than 500 watts without the need for any special control module, comprising, a cylindrical heating assembly having at least two spaced apart, parallel electrically connected lengths of crimped metallic foil provided with electrical power connections and secured to an insulating backing and rolled around an insulating core. Ceramic pins and a thermostatic control element which extend radially through the heating unit provide respectively, support means to prevent sagging of the heating elements in use and a means for detecting heat build-up across a large cross sectional area of the heater while creating a minimum of air flow resistance.

6 Claims, 4 Drawing Figures

SMALL ROUND AIR STREAM HEATING UNIT

This invention relates generally to air stream heaters of the electrical resistance type. More specifically, the invention relates to such heating units which are small, can deliver heated air in an unusually short period of time from start-up, and which operate directly on 120 volts with a wattage output of less than 500 watts, and allow maximum air flow across the heating element.

Small air stream heaters find use as an efficient auxiliary heating means for limited areas and allow individual temperature control in accordance with preferred thermostat settings.

In the past, air stream heaters of the type contemplated wherein the heating element is confined in a housing have used coiled resistance wires in localized areas in the interior of the housing area. However, such wires do not have an appreciable area, and so they must be heated to a high temperature, often to a red heat. Heating of the moving air stream was thus not very efficient. Additionally, there was an appreciable time lag in heating the air from ambient temperature to the desired temperature.

Duct heaters and round air stream heaters comprising a heating element in the form of an electric conductive metal foil in the configuration of a corrugated tape mounted on a support backing, formed into a roll, and positioned within a housing are known. One such heating assembly is disclosed by U.S. Pat. No. 3,265,865—N. E. Hager, Jr.

U.S. Pat. No. 3,770,389 relates to a catalytic converter with electrically resistive catalyst support and comprises an outer housing having an inlet for admitting the exhaust gases to the housing and an outlet for removing the exhaust gases from the housing. A catalyst support structure is located within the housing between the inlet and the outlet. The support structure includes an electrically resistive member having a large surface area and comprises a corrugated metal sheet wound in a spiral so its corrugations form a plurality of small flow passages connecting the housing inlet and the housing outlet. A flat metal sheet may be sandwiched with the corrugated metal sheet, if desired. The sheets are coated with an electrically insulating material and the inner edges thereof are connected to an electrically conductive rod that forms the core of the spiral construction. An electrically conductive tube surrounds and is connected electrically to the outer edges of the metal sheets. The rod and the tube thus form inner and outer terminals for the sheets. Finely divided catalyst is applied to the coatings on the sheets so that the exhaust gases flowing through the small passages contact the catalyst. Electrical energy is supplied to the heater during initial operation to bring the catalyst to the top working temperature within a short time.

U.S. Pat. No. 2,731,713 relates to a method of making a focused multi-cell heating element having a great deal of radiating surface area. In accordance with the invention a strip of corrugated material is co-wound with a strip of flat material on a roll whereby the corrugations of the one strip form a plurality of parallel, axially aligned cells separated by the flat strip. Alternatively, the multi-cell may be formed by stacking the corrugated strip on top of a flat strip, a flat strip on top of a corrugated strip, and thus alternating flat and corrugated strips until the desired thickness is achieved. The corrugated strip comprises electric resistance material and the flat strip may be glass cloth which serves as an insulating spacer. The corrugations in the strip of resistance material may be formed by passing a material between the teeth of a pair of gears. The shape of the corrugations may be altered by altering the shape of the gear teeth from the conventional gear tooth cross section. The size of the individual cells making up the multi-cell roll depends upon the size of the teeth of the gears. The multi-cell may be made up of very long cells (the width of the gears used for making the corrugated foil may be practically any dimension), and the size of the gear tooth may be of any fineness down to 100 pitch or smaller. Focusing of the cells is accomplished by deforming a roll of the above material to give it a concave configuration on the one side and a convex configuration on the other, heating to fix the shape, filling the cells with liquid, solidifying the liquid, and forming a flat-end configuration on the roll.

U.S. Pat. No. 3,651,304 discloses a foil-like corrugated heating element supported internally by a supporting rod having an electrically non-conductive surface, and which extends through most of the corrugations to structurally support the strip at very short intervals.

U.S. Pat. No. 3,835,435 shows another electric heating element assembly for a moving air system utilizing a thin strip of apertured, foil-like material formed with a series of continuous corrugations which establish a wavy pattern. In this patent a central support rod (which does not pass through the foil itself) is used and an insulating member is provided between each of the corrugations and mounted on the central support rod to prevent contact between the corrugations of the foil.

U.S. Pat. No. 3,346,720 shows the use of a spiral corrugated heating element with grooved radial insulating support arms in an infrared surface heating unit. The ribbon-shaped resistance element convolutions are supported in spaced relation to each other in grooves in the radial-insulating support arms.

Electrical air stream heaters in the past have not included a number of desirable features. Namely, they were unduly large, and required the use of a special control module to enable them to be operated on 120 volts. Further, a simple and effective means was needed to support the heating elements and insure against electrical contact of the heating elements during use. An improved means for detecting heat build-up over a large cross-sectional area of the unit was also desirable. It was further desirable that these things be accomplished without adversely affecting the flow of air through the heater and without increasing the size thereof.

SUMMARY OF THE INVENTION

This invention relates to a small electrical air stream heating unit adapted to be used in an enclosing structure having open ends. Forcing air through the heater enables it to be used as an auxiliary spot heater for a limited area. The heating unit comprises thin, crimped, metallic foil heating elements having electrical power connections thereon and being electrically connected to each other and secured to an insulating carrier backing in spaced parallel rows. The heating elements and the carrier are spirally wound around an insulating core and provided with a protective outer cover. Ceramic pins and a thermostatic control element extend radially through the unit to the core and provide respectively, means to prevent possible electrical contact of the heating elements in use, and a means of detecting heat build-up across a large cross-sectional area of the heater while creating a minimum of air flow resistance. The total length, width, and thickness of the thin foil heating element (before crimping) is predetermined to provide the required electrical resistance to enable it to operate directly on 120 volts with a wattage output of less than 500 watts. The foil is crimped, and each crimp is systematically compressed to produce a desired reduction in length and increase the height of the crimps prior to cutting, electrically coupling, and securing the heating elements to the backing.

The heaters of the present invention provide a number of desirable features not present in the heaters of the past. Accordingly, it is the primary object of the present invention to present an air stream heater of the electrical resistance type which is very small and which can operate directly on 120 volts with a wattage output of less than 500 watts and which allows maximum air flow across the heating element. It is a further object of this invention to provide such a heating element having a thin corrugated electrically conductive metal foil secured to an insulating backing and formed into a roll and positioned within a housing. A still further object of the invention is the provision of radial means extending through the roll to the core thereof to support the convolutions of foil and backing and to eliminate the possibility of electrical contact of the heating elements and/or "telescoping" of the heating assembly during operation. Another object of the invention is to present thermostat means which extends radially through said roll to enable a thermal build-up in a large cross section of the unit to be detected while producing only a minor disturbance of the heated air passing through the heater.

DESCRIPTION OF THE PREFERRED EMBODIMENT

Figure 2:
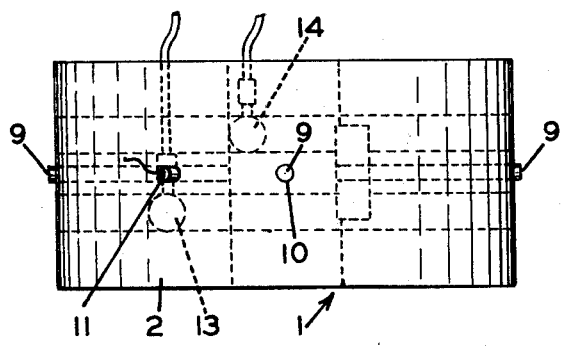
FIG. 2 is a top plan view of the heating unit shown in FIG. 1.
Figure 1:
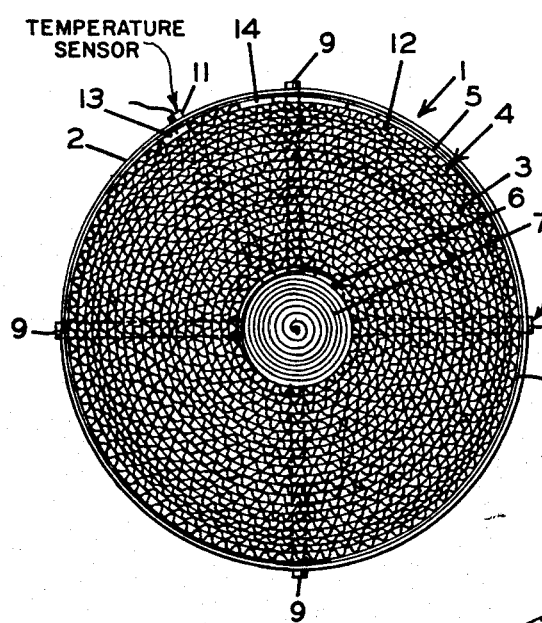
FIG. 1 is an end elevational view of the electric air stream heating unit of this invention.

Referring now to the drawings in detail, particularly to FIGS. 1 and 2, there is shown an electrical air stream heating unit 1 having a housing 2 and a rolled heating assembly 3 positioned therewithin. The heating assembly 3 comprises a heating element 4 secured to an insulating carrier backing 5 therefor. The heating element 4 comprises two 10 feet (3.048 meters) long, spaced, crimped, parallel ribbons of electrically conductive metal foil 4a and 4b, each having a thickness of 0.002 inch (0.051 mm) and a width of 0.500 inch (12.70 mm). The crimped metal foil ribbons 4a and 4b are spaced 0.75 inch (19.05 mm) apart and are electrically connected in a known manner, as shown, by connecting means 6.

Since the metal foil used for ribbons 4a and 4b in the 0.500 (12.70 mm) width and 0.002 inch (0.051 mm) thickness has an average resistance value of about 0.5 ohms per foot (0.305 meters) approximately a 58 feet (17.678 meters) length of the uncrimped metal foil is required for a 120 volt, 500 watt unit.

To reduce the length of the foil and increase the unit length heating surface, the foil was crimped using a set of gears (not shown) to produce corrugations 12 thereon. To produce the desired length, the corrugations 12 were then each systematically compressed to produce a total length of 16 feet (4.877 meters) of the ribbon. The ribbon was then cut in half and each half was stretched to produce a 10 foot (3.048 meters) length. The two 10 foot (3.048 meters) lengths of ribbon 4a and 4b were then placed in parallel relationship and spaced apart a distance of about 0.75 inch (19.05 mm) on a 0.020 inch (0.51 mm) thick, 3 inch (7.62 cm) wide glass fiber backing 5 (see FIGS. 3 and 4). Obviously, other non-combustible electrical insulating backings well known in the art may be used in place of the glass fiber sheet in a similar manner. The ribbons were then electrically connected to each other by connecting means 6, secured to the backing 5, and the entire assembly rolled up. The alternate grooves and ridges of the heating element form a multitude of air-conveying passages. Electrical power connections 13 and 14 were affixed to the metal foil ribbons 4a and 4b in order that power could be applied. The entire assembly was then inserted into a 6 inch (15.24 cm) diameter duct or housing 2.

Although the above widths and thicknesses of foil are preferred, metal foils useable in building the heater of this invention include those having an electrical volume resistivity in the range of about $75 \times 10^{-6}$ ohm-cm to $125 \times 10^{-6}$ ohm-cm, a thickness in the range of from about 0.001 to 0.005 inch (0.025 to 0.127 mm), a width in the range of about 0.250 to 0.750 inch (6.35 to 19.05 mm), and an uncrimped length of about 55 to 65 feet (16.77 to 19.82 meters).

The electrically conductive metallic foil to be used as the heating element in the present invention may be any suitable foil. Metal foils of aluminum, nichrome, copper, stainless steel, and the like may be used. Metallic foil sold under the trade name Inconel 600, having a thickness in the range of 0.001 to 0.005 inch (0.025 to 0.127 mm) is preferred in view of its resistance per unit length, workability, and moderate costs. Different widths of foil may be used in the heating element to achieve a graded temperature in the heating element down the length of the duct in which the element is positioned. The size of the grooves and ridges in the heating element may vary. However, it is preferred that the ridges have a height of about 0.154 inch (3.91 mm) and a distance between peaks of about 0.085 inch (2.16 mm). To some extent the proposed use of a specific duct heater will control the size of the grooves and ridges making up the corrugations. It will be noted again, however, that the length of ribbon needed to build the 120 volt, 500 watt unit and the overall size of the heating unit desired, together with the desirability of increasing the height of the individual crimps as much as possible to allow a better flow of heated air through the layers of the unit will dictate to some extent the height and size of the corrugations of the heating element. The heating element may be secured to the supportive member 5 using the usual adhesives or mechanical means such as insulated staples, or the like. The adhesive used need simply to be able to withstand temperatures at which the particular duct heater operates.

The housing or duct 2 may be of any conventional non-combustible material such as metal, treated paper, resin, or any other material suitable for confining the air as it travels through the duct and for containing the heating assembly. Normally, the duct will be round in shape, but it may be oval, square, rectangular, or any other convenient shape.

As shown especially in FIG. 1, the heating element 4 and backing 5 are spirally wound around an insulating core 7, which may be of the same or different material as that used for the backing 5. An outer protective cover 8, preferably of a proper material to prevent electric leakage, such as a polyamide film, is provided for the outer surface of the rolled heating assembly 3 prior to its insertion into the cylindrical housing 2.

Figure 3:
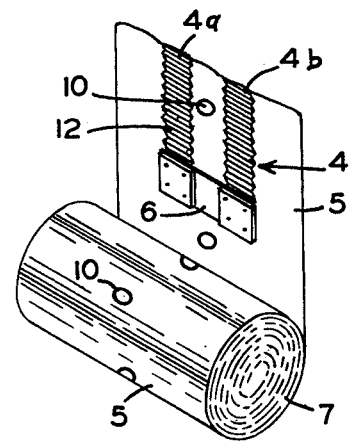
FIG. 3 is a perspective view, partially broken away, illustrating the inner insulating core of the heating unit and the inner end of the insulating backing sheet with the electrically connected foil heating elements mounted thereon.
Figure 4:
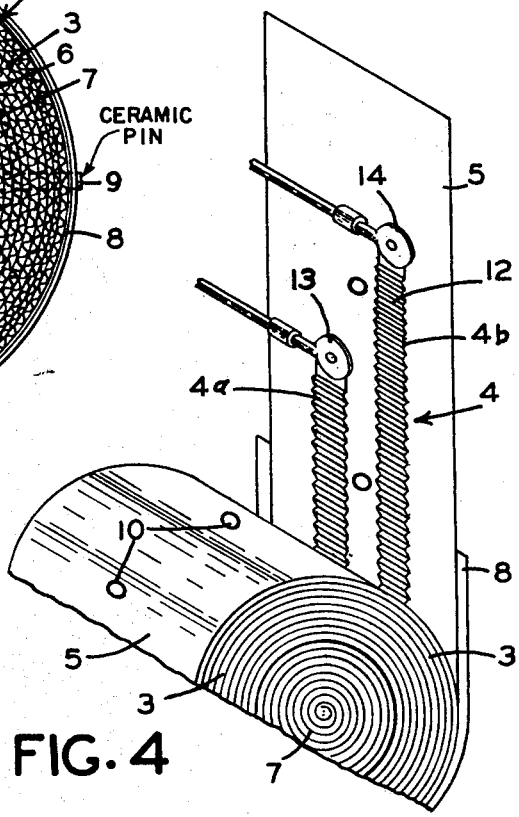
FIG. 4 is a perspective view, partially broken away, of the outer end portion of the heating unit showing the foil heating elements and electrical power connections thereon mounted on the insulating backing sheet, and, the outer protective cover for the unit.

As also shown in FIG. 1, four ceramic pins 9 are provided in holes 10 drilled perpendicular to the surface of the cylindrical unit 1 and between the parallel heating foils 4a and 4b (see FIGS. 2, 3, and 4). The 5/32 inch (3.967 mm) diameter pins were made long enough to reach the core 7 of the heater. Because of their small diameter, these pins 9 create a minimum of air resistance, and even if adhesive is used to hold the foil 4 onto the carrier 5, the ceramic pins 9 being located between the rows 4a and 4b of foil, provide a margin of safety against their coming into electrical contact with each other when the heater is in use.

As shown in FIGS. 1 and 2, a thermostatic control unit 11 having a 5/16 (7.93 mm) inch diameter is provided in a hole drilled perpendicular to the surface of the cylindrical heating unit 1 between the parallel rows 4a and 4b of the heating element 4. This thermostat 11 creates a minimum of air flow resistance and is able to detect a heat build-up over a large cross-sectional area of the heater. If an air flow blockage causes the unit to overheat and to electrically disconnect, it will start up again once the unit cools and the blockage is removed. Although a 75° C. plus or minus 5° C. thermostat is preferred, obviously other protective devices with other ratings may be used.

Interior wiring, not shown, leads from the power connections 13 and 14 on the heating element itself to an external power plug on an enclosing structure (not shown) for the heating unit as a means for introducing electrical current to the heater.

It will be appreciated that the length of a duct heater of the present invention may be varied to suit a particular need. A series of the heating assemblies may be positioned one after the other inside an enclosing structure. Greater heating and higher temperatures of air may be achieved by using longer ducts and multiple heating units positioned therein. Greater power input will also allow greater heating to a given heater. One of the advantages of the present invention is that the duct heater may be designed for the purpose intended by using any of a variety of variables.

The following table contains data illustrating the quick response and effectiveness of one of the limited-area, small air stream heaters of this invention. The temperature data was taken from a 3.9 ampere 468 watt heater in line with the center of the grill thereof. There were about 2.486 square feet (0.2309 square meters) of heating element area in the heater and air was passed therethrough at the rate of 70 cubic feet (1.9822 cubic meters) per minute. This rate of air flow resulted in the most desirable temperatures at the distances at which the heater would normally be used as a "spot" on localized area heater. Increasing the rate of air flow through the heater by any substantial amount results in a lowering of its effectiveness at the distances at which it would normally be used. This is due, of course, to the fact that at such rates the air passes over the heating element too quickly to become adequately heated.

TABLE

| Intake Air (°F.) | Distance from Grill | Time to Heat (°F.) | | | |
|---|---|---|---|---|---|
| | | 30 sec. | 60 sec. | 90 sec. | Max. |
| 55 | 12" | 68 | 78 | 84 | 92 |
| 55 | 18" | 62 | 69 | 73 | 81 |
| 55 | 24" | 58 | 61 | 63 | 69 |
| 55 | 30" | 56 | 57 | 58 | 63 |
| 60 | 12" | 69 | 79 | 84 | 94 |
| 60 | 18" | 67 | 72 | 77 | 84 |
| 60 | 24" | 62 | 65 | 66 | 72 |
| 60 | 30" | 61 | 62 | 63 | 66 |
| 65 | 12" | 79 | 89 | 96 | 109 |
| 65 | 18" | 70 | 72 | 80 | 86 |
| 65 | 24" | 67 | 70 | 72 | 80 |
| 65 | 30" | 65 | 65 | 66 | 69 |

What is claimed is:

1. A small electric resistance air stream heater which operates directly on 120 volts with a wattage output of less than 500 watts comprising
   (1) an electrically insulating housing;
   (2) a rolled heating assembly positioned within the housing, said heating assembly having a diameter of about 6" and comprising in combination,
      (A) an electrically insulating core;
      (B) an electrically conductive crimped metallic foil heating element comprising at least two electrically connected strips thereof, each having crimps in which the distance between peaks is about 0.085 inch, said crimps having a depth of about two times the pitch between successive crimps and being substantially evenly distributed along the lengths of said strips, said foil heating element having electrical volume resistivity falling in the range of from about $75 \times 10^{-6}$ ohm-cm to $125 \times 10^{-6}$ ohm-cm, a thickness in the range of about 0.001 to 0.005 inch (0.025 to 0.127 mm), each of said crimped foil strips having a width in the range of about 0.25 inch to 0.75 inch (6.35 to 19.05 mm), the combined uncrimped length of the foil strips being in the range of about 55 to 65 feet (16.77 to 19.82 meters), said foil heating element having electrical power connections thereon, the crimps in said foil heating element forming alternate grooves and ridges which define a multitude of continuous passageways for air passing through the heater;
      (C) an electrical insulating backing sheet, said electrically connected crimped foil heating elements being secured to one plane surface of said backing sheet in spaced parallel relation to each other;
      (D) support means for said heating assembly extending radially outwardly from the core to the outer surface of the assembly, said support means comprising at least two pins of non-electrical conducting material positioned to extend through the backing for the foil heating element of the rolled heating assembly between the spaced strips thereof; and
      (E) thermostatic means extending radially outwardly from the core through the backing for the foil heating element at a point located between the spaced strips thereof to the outer surface of the assembly to enable a heat build-up to be detected over a large cross-sectional area of the heating assembly.

2. An electric resistance air stream heater according to claim 1 wherein the support means for said heating assembly extending outwardly from the core to the outer surface of the assembly comprises cylindrical ceramic pins each having a diameter of about 5/32 of an inch (0.3967 mm).

3. An electric resistance air stream heater according to claim 1 wherein the thickness, width, and spacing of the crimped foil heating elements are selected in accordance with the heat output per unit area desired and the resistance required to allow the unit to operate directly on 120 volts with a wattage output of less than 500 watts.

4. An electric resistance air stream heater according to claim 1 wherein the two electrically connected strips of the crimped foil heating element are each about 10 feet long (3.048 meters) and each have a thickness of about 0.002 inch, (0.051 mm) and a width of about 0.500 inch, (12.70 mm), and are spaced apart a distance of about 0.75 inch (19.05 mm), the length of each strip before crimping being about 29 feet (8.839 meters), the height of the crimps being about 0.154 inch (3.91 mm).

5. An electric resistance air stream heater according to claim 1 wherein the metal foil comprises copper foil.

6. An electric resistance air stream heater according to claim 1 wherein the housing (material), is cylindrical in shape, and has an inner diameter of about 6 inches (15.24 cm).

* * * * *